United States Patent [19]

Fujiya

[11] Patent Number: 4,499,917
[45] Date of Patent: Feb. 19, 1985

[54] VENTILATOR FOR COLDROOM WITH PRESSURE RESPONSIVE VALVES

[76] Inventor: Toshimichi Fujiya, No. 4-22, Kounandai 6-chome, Kounan-ku, Yokohama-shi, Kanagawa-ken, Japan

[21] Appl. No.: 471,257

[22] Filed: Mar. 2, 1983

[51] Int. Cl.³ ............................................. F16K 17/194
[52] U.S. Cl. .................................. 137/341; 137/493.9
[58] Field of Search ...................... 137/341, 493.9, 493, 137/340

[56] References Cited

U.S. PATENT DOCUMENTS

| | | | |
|---|---|---|---|
| 2,704,085 | 3/1955 | Bieger et al. | 137/341 |
| 4,091,837 | 5/1978 | Edmunds et al. | 137/341 |
| 4,180,093 | 12/1979 | Kamezaki | 137/493.9 |

Primary Examiner—A. Michael Chambers
Assistant Examiner—Sheri Novack
Attorney, Agent, or Firm—Martin Smolowitz

[57] ABSTRACT

A ventilator for a coldroom with pressure responsive valves wherein a first valve plate becomes free from a partition wall so as to open a first valve port when internal pressure is increased, and a second valve plate becomes free from said partition wall so as to open a second valve port when internal pressure is reduced. Electric heaters are disposed at supporting rib portions between said respective valve ports and at outer peripheral portions of said valve ports or in the vicinity of those portions, thereby to heat contact portions of said valve plates with said partition wall. The ventilator can be precisely and susceptively operated in response to changes of internal pressure without fear of malfunction due to freezing.

7 Claims, 8 Drawing Figures

VENTILATOR FOR COLDROOM WITH PRESSURE RESPONSIVE VALVES

FIELD OF THE INVENTION

This invention relates to a ventilator used in coldrooms such as a large-sized refrigerator, freezer, or the like, and particularly to a ventilator for a coldroom provided with valve means which automatically open and close valve ports in response to an increase or reduction of pressure within the coldroom.

BACKGROUND OF THE INVENTION

In the conventional ventilator for a coldroom with pressure responsive valves, a partition wall is provided within a ventilation path adapted to interconnect the inside and the outside of the coldroom, and valve ports bored in the partition wall are opened and closed by means of valve plates which come into contact with or are free from the partition wall in response to an increase or reduction of internal pressure. However, such ventilator has encountered such a problem that there occur buildups of frost and ice due to a large difference in temperature within and without the coldroom. When such buildups of frost and ice exceed a certain limit, the valve plates become fixed to the partition wall and hence will not become free therefrom.

SUMMARY OF THE INVENTION

Therefore, it is an object of the invention to provide a ventilator for a coldroom with pressure responsive valves, which is precisely and susceptively operated in response to changes of internal pressure without a fear of malfunction due to freezing.

This invention is featured in a ventilator for a coldroom with pressure responsive valves such that a first valve port and a second valve port are formed independently from each other in a partition wall extending to cross a ventilation path, the first valve port is closed by a first valve plate disposed on the outer side of the partition wall, the second valve port is closed by a second valve plate disposed on the inner side of the partition wall, the first valve plate becomes free from the partition wall so as to open the first valve port when internal pressure is increased, and the second valve plate becomes free from the partition wall so as to open the second valve port when internal pressure is reduced, wherein electric heaters are disposed at supporting rib portion between the respective valve ports of the partition wall and at outer peripheral portions of the valve ports or in the vicinity of both portions, thereby to heat contact portions of the valve plates with the partition wall.

BRIEF DESCRIPTION OF THE DRAWINGS

In the following description the invention will be described in detail with reference to the accompanying drawings which illustrate a preferred embodiment of the invention, in which.

DETAILED DESCRIPTION OF THE INVENTION

Figure 1:
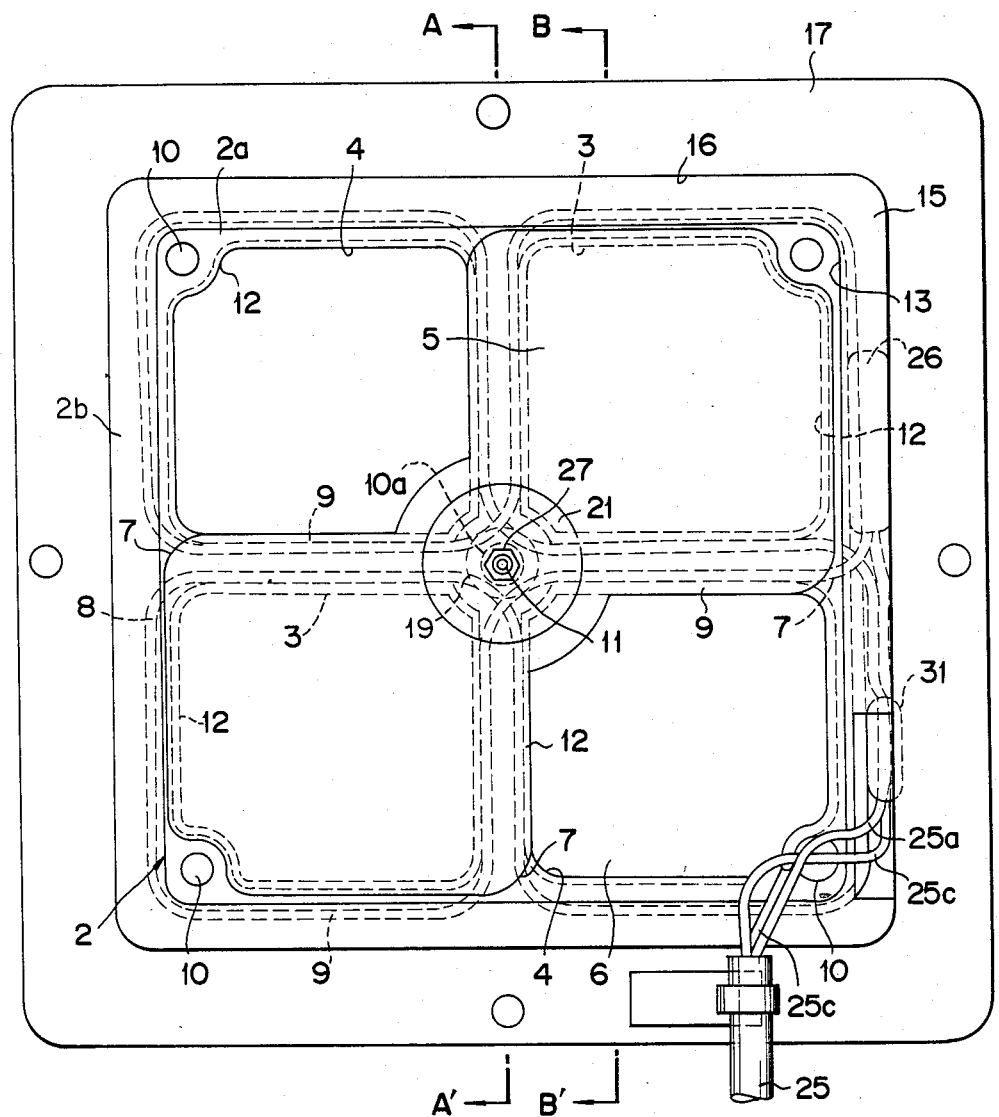
FIG. 1 is a front view of a ventilator with louvers, etc. being removed.
Figure 2:
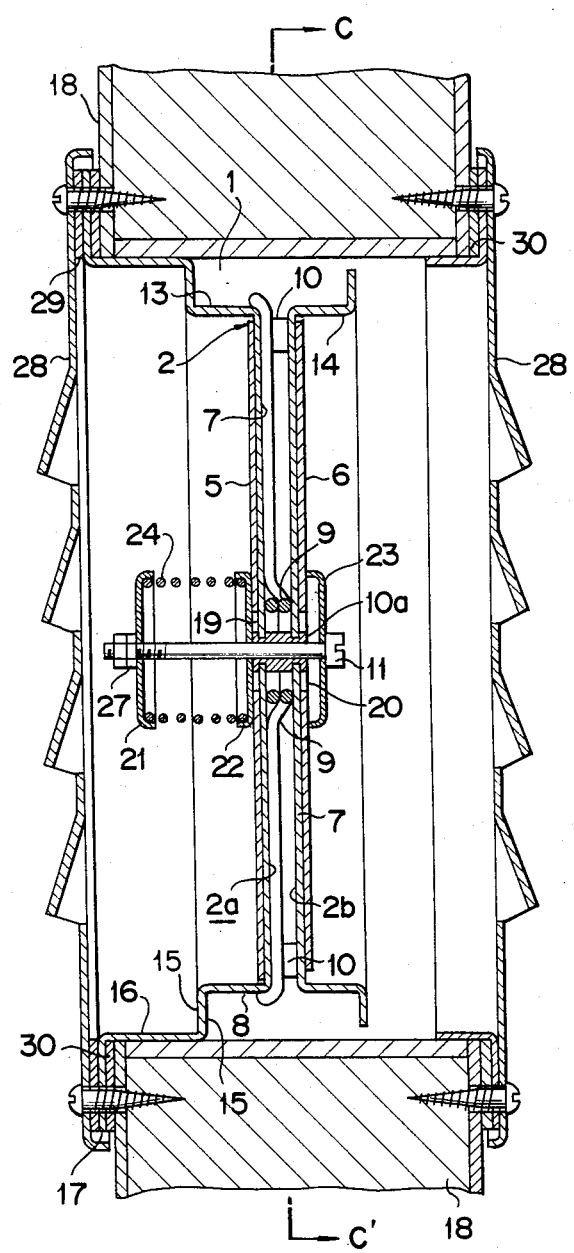
FIG. 2 is a section view of a ventilator taken along the line A-A' in FIG. 1 including louvers on each side.
Figure 3:
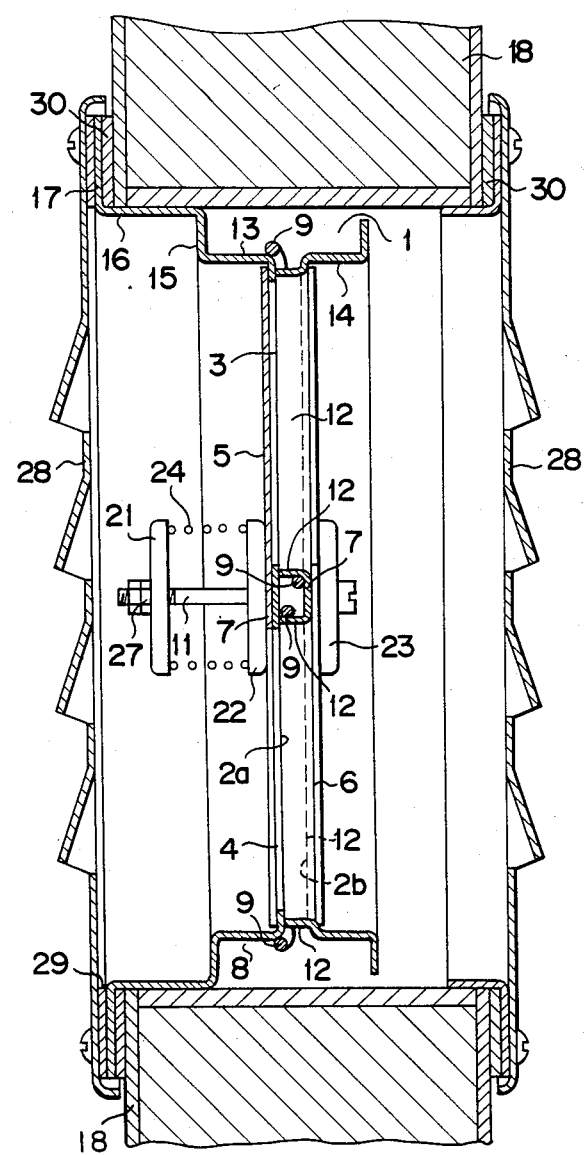
FIG. 3 is a sectional view taken along the line B-B' in FIG. 1 including louvers on each side.
Figure 4:
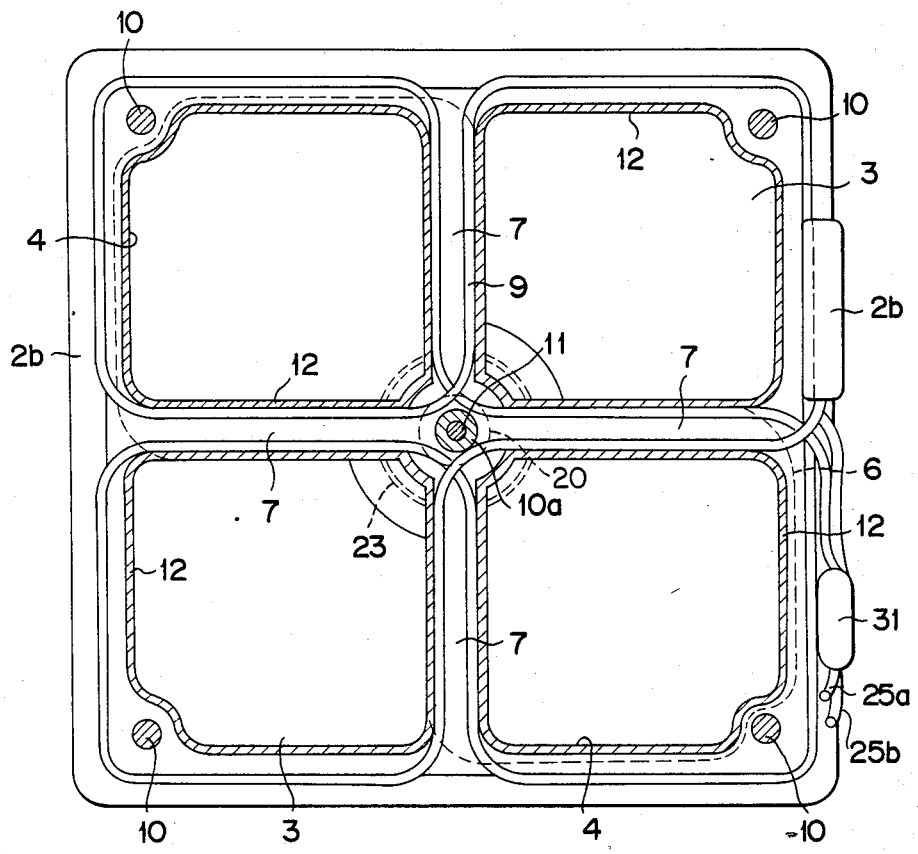
FIG. 4 is a sectional view taken along the line C-C' in FIG. 2.
Figure 5:
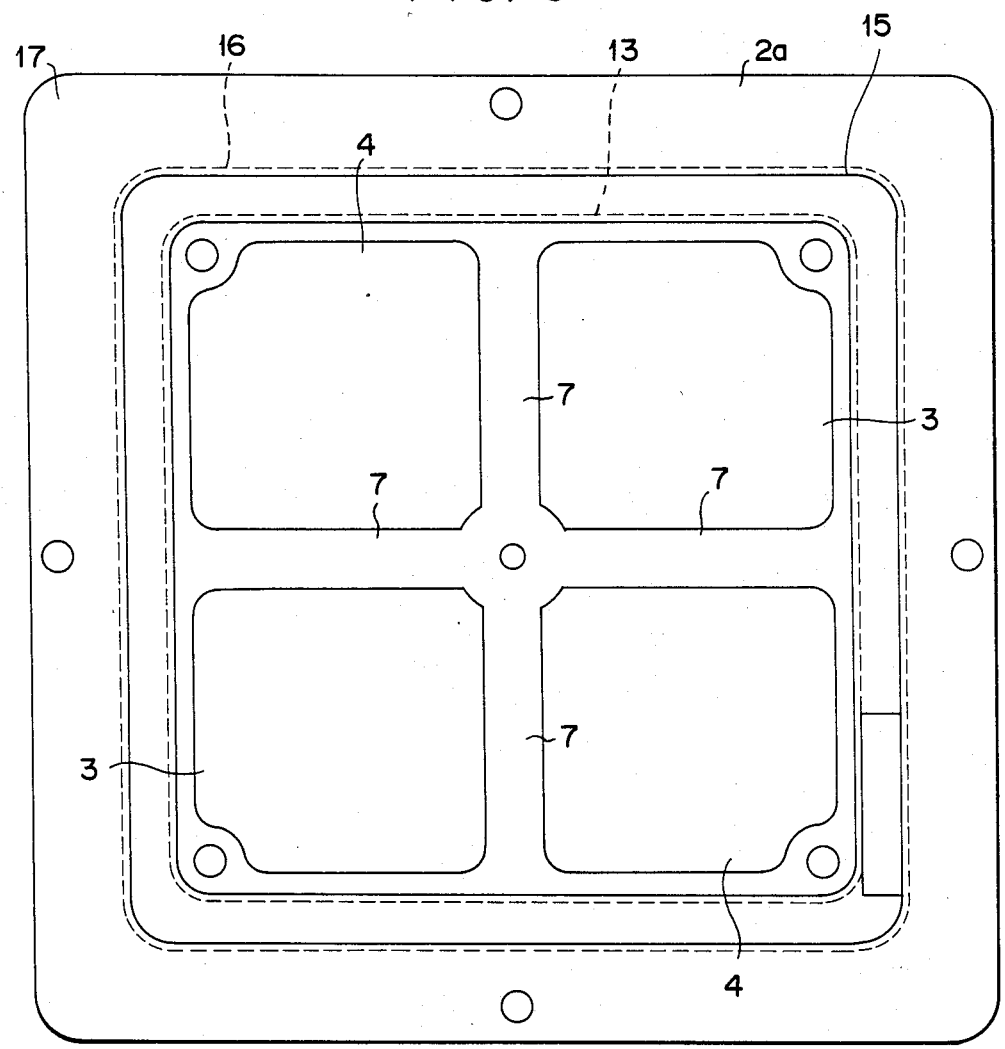
FIG. 5 is a front view of an outer wall plate of a partition wall of the ventilator.
Figure 6:
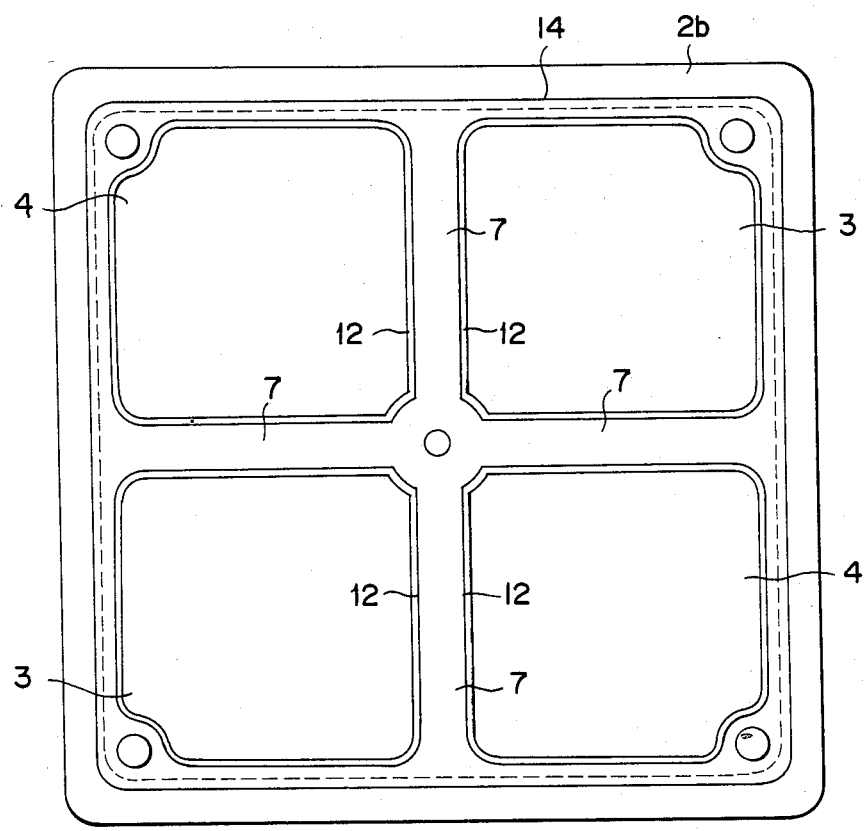
FIG. 6 is a front view of an inner wall plate of a partition wall of the ventilator.
Figure 7:
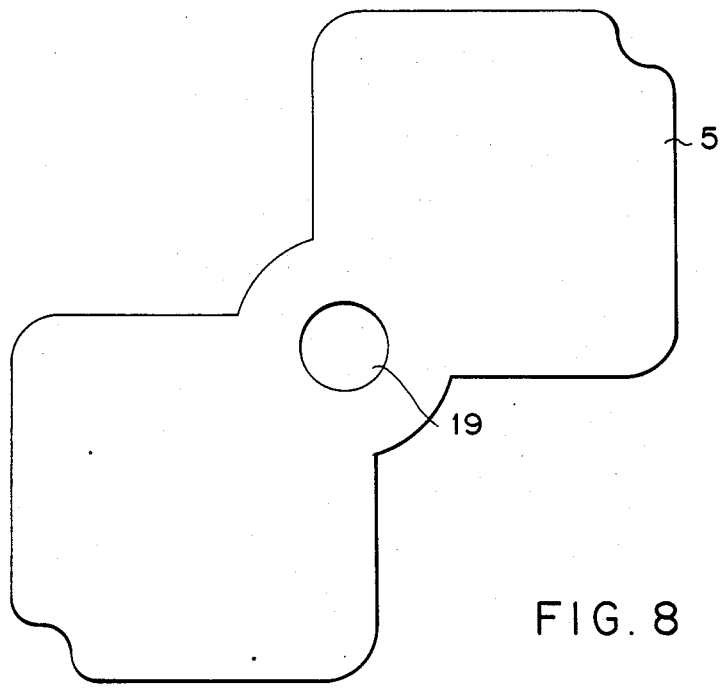
FIGS. 7 and 8 are front views of first and second valve plates of the ventilator, respectively.
Figure 8:
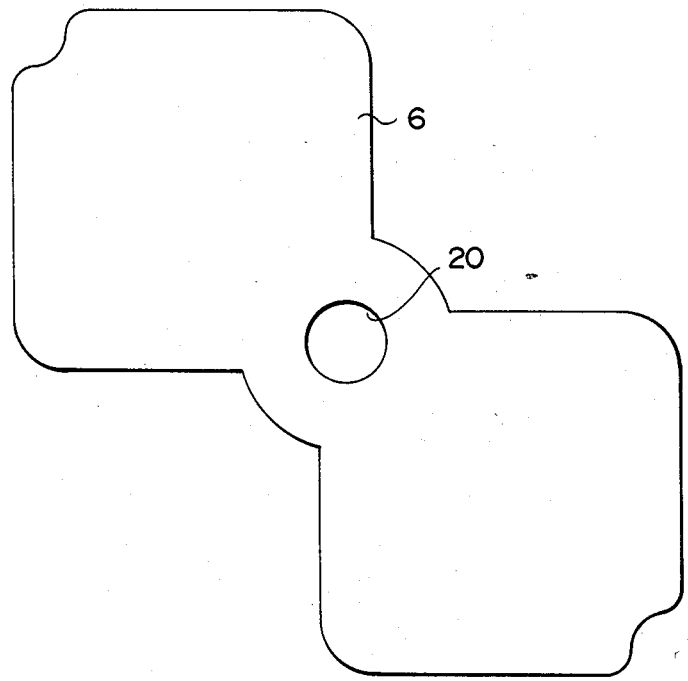

As illustrated in FIGS. 1 to 3, a partition wall 2 is constituted to be hollow by a pair of outer and inner wall plates 2a, 2b having a square shape and extending in parallel. Both the wall plates 2a and 2b are interconnected by means of fixtures 10 fitted at the center and four corners with a predetermined space therebetween. A first valve port 3 and a second valve port 4 comprise each a pair of openings which are symmetrical with respect to a shaft 11 slidably inserted through a fixture 10a at the center of the wall plates. The inner wall plate 2b includes peripheral walls 12 vertically projected from edge portions of the respective valve ports. The peripheral wall 12 is continuous all over the circumference of each valve port and its distal end surface comes into abutment with the inner face of a supporting rib portion 7 of the outer wall plate 2a, so that the pair of two first valve ports 3 and second valve ports 4 are not in communication with each other and independent completely. Cord heaters are used as electric heaters 9 and those heaters to be disposed at the supporting rib portions of the partition wall are interposed between the adjacent peripheral walls 12 and 12.

The wall plates 2a and 2b are provided at the outer peripheries thereof with square tubular portions 13 and 14 extending perpendicular to the wall plates. The square tubular portion 13 is connected to a still larger square tubular portion 16 through a stepped portion 15, the square tubular portion 16 being provided at the distal end thereof with a flange 17 through which the outer wall plate 2a is fixed to a side wall 18 of the coldroom. Those heaters 9 to be disposed at the outer peripheral portions of the partition wall are fitted on the outer peripheral surface of the square tubular portion 13 or 14. The heaters disposed at the supporting rib portions and the outer peripheral portions of each valve port are formed of a single cord heater arranged the extend around the valve port, and therefore the cord heater becomes double in number along the supporting rib portions 7. The continuous heater 9 is fed with electric power via a 3-core cabtyre cord 25, in which a core cord 25a is connected to one end of the heater 9 through a thermostat 26 and a core cord 25b is connected to the other end of the heater 9. The remaining core cord 25c is connected to the outer wall plate 2a of the partition wall by means of a grounding screw which serves also as the fixture 10.

Central openings 19 and 20 of a first valve plate 5 and a second valve plate 6 respectively have a larger diameter than that of the fixture 10a which serves also as a bearing for the shaft 11, whereby the first and second valve plates 5, 6 come into contact with or free from the corresponding wall plates 2a and 2b of the partition wall, respectively, while being guided by the inner surfaces of the square tubular portions 13 and 14. In other words, the shaft 11 does not serve as a means for guiding and aligning the valve plates. Three circular seat plates 21, 22 and 23 are loosely fitted via their respective central holes onto the bolt-like shaft 11, which in turn is loosely fitted in the central openings 19 and 20 of the first and second valve plates respectively. A coil spring 24 is compressively interposed between the intermediate seat plate 22 in abutment with the outer face of the first valve plate 5 and the outer seat plate 21. The inner seat plate 23 is in abutment with the inner face of the second valve plate 6.

By virtue of biasing of the coil spring 24, the first valve plate 5 and the second valve plate 6 are brought into pressure contact with the corresponding outer and inner wall plates 2a, 2b of the partition wall, respectively, thus closing both the first and second valve ports 3, 4 in the normal state. When internal pressure is increased and exceeds a preset value, the first valve plate 5 becomes free from the wall plate 2a against biasing of the coil spring 24 so as to open the first valve port 3. At this time, the shaft 11 is held immobile and only the intermediate seat plate 22 is slid outward along the shaft 11. The second valve plate 6 is pressed upon the inner wall plate 2b thereby to maintain the closed state of the second valve port 4.

On the other hand, when internal pressure is lowered less than the preset value, the second valve plate 6 moves inward against biasing of the coil spring 24 so as to open the second valve port 4. At this time, the intermediate seat plate 22 is held immobile and the shaft 11 is moved inward together with the inner and outer seat plates 21, 23. The first valve plate 5 is pressed upon the outer wall plate 2a thereby to maintain the closed state of the first valve port 3. The preset value for operating the first valve plate 5 and the second valve plate 6 can be easily adjusted by turning a nut 27 at the outer end of the shaft to move forward or backward. In the drawings, designated at 28 is a louver, 29 is an insect-tight, dustproof net, 30 is a packing and 31 is a pressure bonding electrical connector or terminal.

According to the ventilator for a coldroom the pressure responsive valves of this invention, as stated in the above, since the electric heaters 9 are disposed at the supporting rib portions 7 between the vent ports of the partition wall 2 and at the outer peripheral portions 8 of the valve ports or in the vicinity of those portions so as to directly heat the contact portions of the first and second valve plates 5, 6 with the partition wall 2, there occurs no buildup of frost and ice between the partition wall and the respective valve plates even under a large difference in temperature within and without the coldroom. Thus, the first valve plate 5 and the second valve plate 6 become free from the partition wall 2 in response to an increase or reduction of internal pressure susceptibly, thereby to open the corresponding first and second valve ports 3, 4 in a precise manner. That is, the present invention provides a ventilator for a coldroom with pressure responsive valves which has good stability and reliability in its operation.

What is claimed is:

1. In a ventilator for a coldroom with pressure responsive valves wherein a first valve port and a second valve port are formed independently from each other in a partition wall having supporting rib portions extending to cross a ventilation path, said first valve port is closed by a first valve plate disposed on the outer side of said partition wall, said second valve port is closed by a second valve plate disposed on the inner side of said partition wall, said first valve plate becomes free from said partition wall so as to open said first valve port when internal pressure is increased, and said second valve plate becomes free from said partition wall so as to open said second valve port when internal pressure is reduced, an improvement in that electric heaters are disposed at said supporting rib portions between said respective valve ports of said partition wall and at outer peripheral portions of said valve ports or in the vicinity of those portions, thereby to heat contact portions of said valve plates with said heated partition wall.

2. A pressure responsive ventilator according to claim 1, wherein said first and second valve plates have their alternate movements controlled by a compression spring means located around a shaft supported in a central portion of said partition wall, so as to control the alternate opening of said first and second valve ports responsive to pressure differential.

3. A ventilator having dual pressure responsive valves for coldroom service, said ventilator comprising:
    (a) a partition wall with supporting rib portion, said wall having a first valve port and a second valve port provided therein;
    (b) a first valve plate disposed on an outer side of said partition wall for closing said first valve port;
    (c) a second valve plate disposed on an inner side of said partition wall for closing said second valve port;
    (d) compression spring means centrally located in said partition wall rib portion for retaining said first valve plate and said second valve plate seated against said partition wall and the supporting rib portion to provide for pressure sealing said first and second valve ports; and
    (e) electric heaters disposed at the supporting rib portion between the respective valve ports of the partition wall and along outer peripheral portions of the wall, so as to heat the portions of said partition wall in contact with said valve plates.

4. A pressure responsive ventilator according to claim 3, wherein said partition wall is made rectangular shape, and the movement of said first and second valve plates against said compression spring is guided by outer rectangular tubular portions of said partition wall.

5. A pressure responsive ventilator according to claim 3, wherein said partition wall is extended at one side to include a flange for attaching said ventilator into an opening in a wall of a coldroom.

6. A pressure responsive ventilator as defined by claim 5, wherein louvers are provided on at least said one side of the ventilator and attached to said flange.

7. A pressure responsive ventilator according to claim 5, wherein an insect-tight net is provided between said flange and said louver.

* * * * *